T. WHITE.
PRESSURE CUT-OFF.
APPLICATION FILED AUG. 21, 1917.
1,380,030.
Patented May 31, 1921.
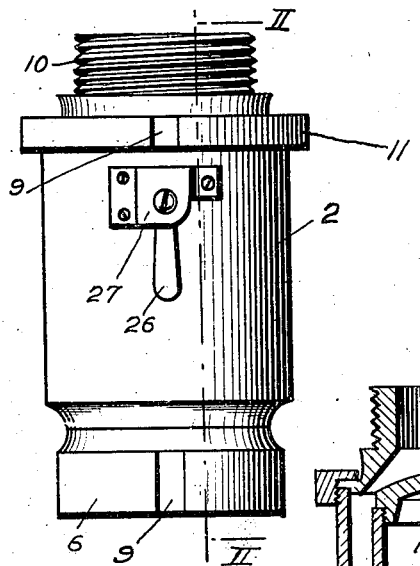
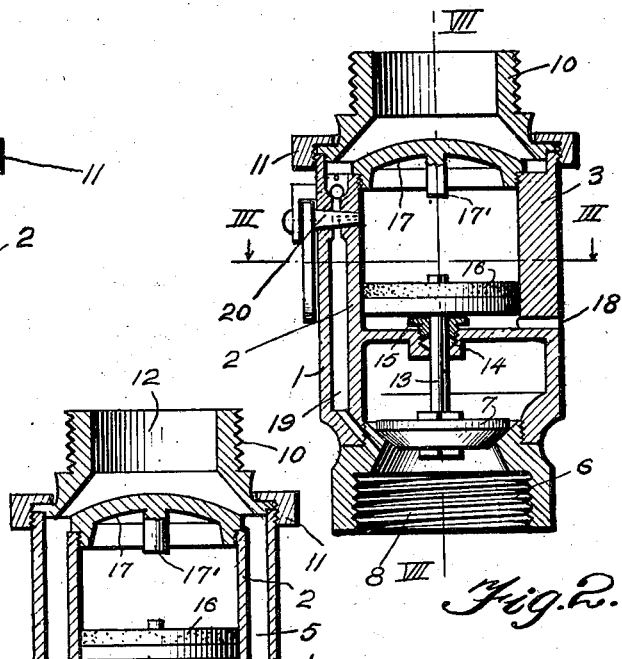
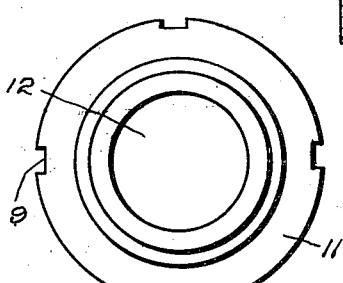
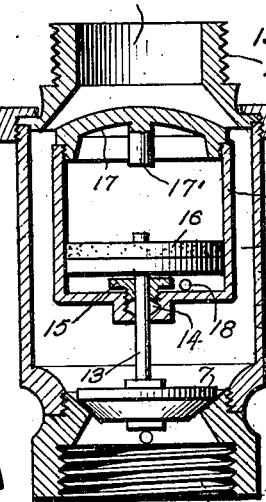
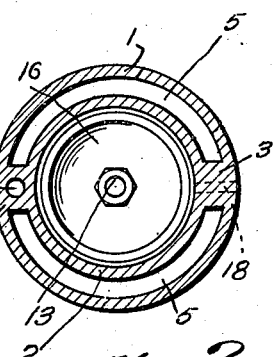
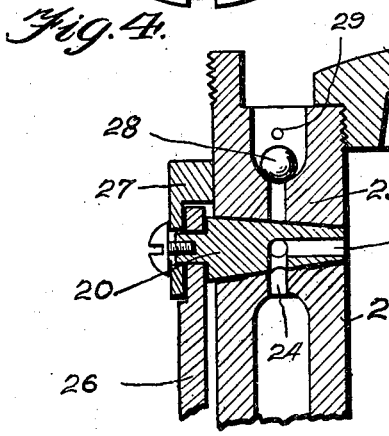
Inventor
Tilman White,
By C. L. Parker
Attorney

UNITED STATES PATENT OFFICE.

TILMAN WHITE, OF BERKELEY, CALIFORNIA, ASSIGNOR OF ONE-THIRD TO RAYMOND SALISBURY AND ONE-THIRD TO E. F. PECKHAM, BOTH OF BERKELEY, CALIFORNIA, AND ONE-THIRD TO PAUL E. WEITHAASE, OF SAN FRANCISCO, CALIFORNIA.

PRESSURE CUT-OFF.

1,380,030.  Specification of Letters Patent.  Patented May 31, 1921.

Application filed August 21, 1917. Serial No. 187,498.

*To all whom it may concern:*

Be it known that I, TILMAN WHITE, a citizen of the United States, residing at Berkeley, county of Alameda, and State of California, have invented certain new and useful Improvements in Pressure Cut-Offs, of which the following is a specification.

This invention relates particularly to cut off valves for pipe lines, such as fire hose air lines and the like, carrying liquid or other fluid under pressure, particularly high pressure; and has among its objects utilization of such pressure for the opening and closing of the valve.

Another object is to provide a valve and valve mechanism compact and neat in structure, simple and positive in operation and operated by the minimum manual effort.

The present embodiment of the invention is particularly designed for use in connection with fire hose, wherein it is important, particularly in handling high water pressure, to open and close the shut-off valve to control the flow of water through the hose without shock liable to produce water hammer, with its resultant deleterious effect upon the pipe lines and the pumping mechanism.

In this specification and the annexed drawings the invention is illustrated in the form considered to be the best, but it is to be understood that the invention is not limited to such form, because it may be embodied in other forms, and it is also to be understood that in and by the claims following the description it is my desire to cover the invention in whatever form it may be embodied.

In the accompanying one sheet of drawings:

Figure 1 is a side elevation of a cut-off valve constructed in accordance with this invention.

Fig. 2 is a longitudinal section of the same, taken on the line II—II Fig. 1.

Fig. 3 is a cross section of the same, taken on the line III—III, Fig. 2.

Fig. 4 is an end view looking into the inlet of the valve.

Fig. 5 is an enlarged fragmentary detail of the manual control and interrelated valve mechanism in cross section as illustrated in assembly in Fig. 2.

Fig. 6 is a detached detail in cross section of the manually operated valve plug.

Fig. 7 is a vertical section taken through Fig. 2 on the line VII—VII.

In detail the construction illustrated in the drawings includes the outer cylindrical casing 1, having a concentric inner cylinder 2 spaced therefrom by the webs 3 and 4, forming the segmental passages 5—5 between the casing 1 and the cylinder 2. The area of said passages being greater than the area of the inlet valve, so as not to impede the flow of water through the casing 1. The inlet end 6 of the casing is provided with an inwardly directed valve seat closed by the valve 7. The inlet is threaded as at 8 and provides convenient means for attachment to the fire hose, or hydrant, and is provided with the external gap 9 for engagement with the usual spanner or wrench. The opposite end of the casing is completed by the outlet 10 threaded for attachment to the fire hose or nozzle in the usual manner. The outlet being attached to the casing 1 by the sleeve 11 threaded thereon and engaging a shoulder on the outlet 10. The outlet opening 12 communicates with the interior of the shell 1 to receive the flow through the segmental passages 5—5. The inlet end 6 is made separable from the main shell 1 for convenience in forming the valve seat or replacing the parts when the valve seat or spread is worn sufficiently to require replacement.

The valve stem 13 extends through a stuffing box 14, filled with a suitable packing compressed by the gland 15. The piston 16 is fixed on the opposite end of the valve stem 13 within the cylinder 2, the interior walls of which are finished to make a pressure tight fit with the piston 16 which may be of any desired type, that preferred by me being a cup leather, because of its dependability. The opposite end of the cylinder is closed by the cylinder head 17 screwed therein, converting the cylinder 2 into a pressure tight chamber sealed off from the pressure within the casing 1. This cylinder is vented to the atmosphere through the vent hole 18 passing through the web 3 (see Fig. 2).

As representing a definite quantity, the pressure in the line ahead of the valve 7 will hereinafter be referred to as the static pressure. Static pressure is admitted to the cylinder 2 through the by-pass 19 cored or otherwise formed in the web 4 and opening through the inlet 6 to the pressure ahead of the valve 7. The pressure in this passage is controlled by the interposed plug valve 20 (see Fig. 5) ground into the casing 1 transversely to the passage 19. This plug has a three way passage represented by the longitudinal bore 21 meeting the transverse branches 22 and 23, alined with the inlet 24 and the outlet 25. The bore 21 opens into the cylinder 2 (see Figs. 2 and 5). The plug is operated by the handle 26 engaging the angular head of the plug 20 and held in position by the overhanging bracket 27 fastened to the exterior of the shell and bearing against the handle and the plug to hold the latter snugly in its socket to prevent leakage when the plug is rotated.

This invention operates substantially as follows: With the handle 26 in the position illustrated in the drawing (see Fig. 2) the static pressure from the by-pass 19 is communicated through the passage 23 into the bore 21 in the valve plug, from thence into the cylinder 2, said cylinder being entirely filled with pressure fluid. The piston 16 being of greater superficial area than the valve 7, the hydrostatic pressure in the main line is overbalanced and the valve 7 remains seated, cutting off the flow through the casing 1 entirely.

The descent of the piston 16 is retarded by the restricted aperture 18, through which the whole volume of air behind the piston must escape before the valve 7 seats, thus forming an air cushion to prevent the sudden hammering of the valve 7.

This vent also acts as an outlet for any leakage that may pass through the stuffing box 14, if because of excessive wear or other causes, this leakage should be excessive and should fill the cylinder between the piston and the stuffing box, the retarding effect would still be present when the valve closed, the imprisoned liquid acting as a dashpot to retard the action of the piston, while the liquid was escaping through the restricted opening 18.

To open the valve 7, the handle 26 is swung to the right (Fig. 1) rotating the plug 20 until the passage 22 communicates with the passage 25, permitting the liquid or air within the cylinder 2 to pass through the bore 21 and the by-pass 22 into the passage 25 which communicates with the interior of the casing 1, wherein the pressure is less than the hydrostatic pressure if the outlet 12 is open behind the valve 7. When the valve 7 opens to the full extent the end of the valve stem 13 strikes the abutment 17' on the cap 17 arresting its further opening to prevent the piston shutting off the opening 21 in the plug 20. It is manifest that the opening and closing of the valve 7 is synchronous with the movement of the handle 26 and the valve 20 controlled thereby. In this manner the valve 7 can be opened as much or as little as desired, by consistent control of the handle 26. The restricted opening 21, acting as a dash pot, relieves the pressure in cylinder slowly, causing the valve 7 to open gradually.

Back pressure into the cylinder 2 is prevented by the check valve 28 seating across the exit of the passage 25. The valve 28 is dislodged from its seat as the pressure flows outward through the passage 25, but is prevented from escaping by the pin 29 across the recess within which the ball valve 28 acts.

Having thus described my invention, what I claim and desire to secure by Letters Patent is:

1. A pressure cut off including a casing having a passage therethrough, a main valve in said passage; a cylinder concentrically spaced within said passage behind said valve and joined to said casing by webs; a by-pass in one of said webs open ahead of said valve; a control valve open to said cylinder and to said passage and to said passage respectively at will; a piston in said cylinder connected to said main valve, and a restricted vent to the atmosphere between said piston and said main valve.

2. A pressure cut off including a casing having a passage therethrough; a main valve in said passage; a cylinder in said passage spaced from the walls of said casing by integral webs; a piston in said cylinder connected to said valve; a restricted vent through one of said webs between said piston and said main valve; a by-pass in one of said webs, open ahead of said main valve and discharging into said passage through a check valve; a control valve plug in said passage having a longitudinal bore opening to said cylinder, and a lateral opening leading into said bore and adapted to aline with said bypass on opposite sides of said plug when said plug is turned.

In testimony whereof I affix my signature in presence of two witnesses.

TILMAN WHITE.

Witnesses:
E. F. PECKHAM,
RAYMOND SALISBURY.